(12) United States Patent
Lawbaugh

(10) Patent No.: US 10,503,805 B2
(45) Date of Patent: Dec. 10, 2019

(54) GENERATING FEEDBACK FOR A TARGET CONTENT ITEM BASED ON PUBLISHED CONTENT ITEMS

(71) Applicant: Oracle International Corporation, Redwood Shores, CA (US)

(72) Inventor: Paul Claudell Lawbaugh, Hillsboro, OR (US)

(73) Assignee: Oracle International Corporation, Redwood Shores, CA (US)

( * ) Notice: Subject to any disclaimer, the term of this patent is extended or adjusted under 35 U.S.C. 154(b) by 160 days.

(21) Appl. No.: 15/383,571

(22) Filed: Dec. 19, 2016

(65) Prior Publication Data

US 2018/0173713 A1   Jun. 21, 2018

(51) Int. Cl.
*G06F 17/30* (2006.01)
*G06F 16/958* (2019.01)

(52) U.S. Cl.
CPC .................................. *G06F 16/958* (2019.01)

(58) Field of Classification Search
None
See application file for complete search history.

(56) References Cited

U.S. PATENT DOCUMENTS

| | | | |
|---|---|---|---|
| 7,685,575 B1 * | 3/2010 | Fareed | G06F 11/0715 714/37 |
| 8,230,062 B2 * | 7/2012 | Newton | G06Q 30/0201 709/223 |
| 8,655,938 B1 | 2/2014 | Smith et al. | |
| 8,676,875 B1 | 3/2014 | Smith et al. | |
| 8,712,953 B2 | 4/2014 | Beringer et al. | |
| 8,856,232 B1 | 10/2014 | Swerdlow et al. | |
| 8,892,960 B2 * | 11/2014 | Sambamurthy | G06F 11/079 714/47.3 |
| 9,262,517 B2 | 2/2016 | Feng et al. | |
| 9,330,119 B2 | 5/2016 | Chan et al. | |
| 9,392,049 B2 | 7/2016 | Ennis et al. | |
| 9,436,758 B1 * | 9/2016 | Lewis | G06F 16/35 |
| 9,442,984 B2 | 9/2016 | Smith et al. | |

(Continued)

OTHER PUBLICATIONS

The Value of Social Data, Oracle social white paper, Dec. 2013, http://www.oracle-downloads.com/valueofsocial.pdf.

(Continued)

*Primary Examiner* — Hung D Le
(74) *Attorney, Agent, or Firm* — Invoke

(57) ABSTRACT

Techniques for generating feedback for an unpublished content item based on published content items are disclosed. A content feedback engine identifies published content items associated with similar attributes as the unpublished content item. Effectiveness scores of the published content items are determined. The content feedback engine determines an effectiveness score for a portion of the unpublished content item based on the effectiveness scores of the published content items. The content feedback engine presents a graphical indication that marks the portion of the unpublished content item based on the effectiveness score for the portion of the unpublished content item. Additionally or alternatively, the content feedback engine recommends content to be added to and/or removed from the unpublished content item based on the content and/or attributes of the published content items.

20 Claims, 6 Drawing Sheets

(56) References Cited

U.S. PATENT DOCUMENTS

| | | | |
|---|---|---|---|
| 9,536,269 B2 | 1/2017 | Chang et al. | |
| 9,633,399 B2 | 4/2017 | George et al. | |
| 10,019,988 B1* | 7/2018 | Chan | G10L 25/63 |
| 2007/0265864 A1 | 11/2007 | Chess et al. | |
| 2009/0106603 A1* | 4/2009 | Dilman | G06F 11/0727 |
| | | | 714/42 |
| 2009/0319288 A1 | 12/2009 | Slaney et al. | |
| 2012/0046936 A1* | 2/2012 | Kandekar | G06Q 30/0282 |
| | | | 704/9 |
| 2012/0158476 A1* | 6/2012 | Neystadt | G06Q 30/0214 |
| | | | 705/14.16 |
| 2012/0185735 A1* | 7/2012 | Sambamurthy | G06F 11/079 |
| | | | 714/47.1 |
| 2012/0290562 A1 | 11/2012 | Wable et al. | |
| 2012/0296845 A1 | 11/2012 | Andrews et al. | |
| 2013/0073378 A1* | 3/2013 | Naveh | G06Q 10/10 |
| | | | 705/14.41 |
| 2013/0166379 A1* | 6/2013 | Ehindero | G06Q 30/02 |
| | | | 705/14.52 |
| 2013/0290458 A1 | 10/2013 | Morris et al. | |
| 2013/0325550 A1 | 12/2013 | Varghese et al. | |
| 2014/0006977 A1 | 1/2014 | Adams | |
| 2014/0074551 A1 | 3/2014 | Setayesh et al. | |
| 2014/0074844 A1* | 3/2014 | Subramanian | G06Q 10/10 |
| | | | 707/739 |
| 2014/0180788 A1 | 6/2014 | George et al. | |
| 2014/0188863 A1* | 7/2014 | Grauman | G06F 16/48 |
| | | | 707/728 |
| 2014/0214495 A1 | 7/2014 | Kutty et al. | |
| 2014/0222604 A1 | 8/2014 | Yellapragada | |
| 2014/0280625 A1 | 9/2014 | Byrd et al. | |
| 2015/0020086 A1* | 1/2015 | Chen | H04N 21/44218 |
| | | | 725/12 |
| 2015/0066788 A1 | 3/2015 | Tebbe | |
| 2015/0169587 A1 | 6/2015 | Silverman et al. | |
| 2016/0004529 A1 | 1/2016 | Xia et al. | |
| 2016/0063442 A1* | 3/2016 | Bennett | G06Q 10/1053 |
| | | | 705/319 |
| 2016/0148325 A1 | 5/2016 | Dhawan et al. | |
| 2017/0053298 A1* | 2/2017 | Sun | G06Q 30/0203 |
| 2017/0061528 A1* | 3/2017 | Arora | G06F 16/24578 |
| 2017/0132230 A1* | 5/2017 | Muralidhar | G06F 16/9535 |
| 2017/0366641 A1 | 12/2017 | Fultz et al. | |
| 2018/0173713 A1* | 6/2018 | Lawbaugh | G06F 16/958 |

OTHER PUBLICATIONS

MDM Driven Data Enrichment, IBM InfoSphere Master Data Management, Version 11.3, Mar. 16, 2016, https://www.ibm.eom/support/knowledgecenter/api/content/nI/en-us/SSWSR9_11.3.0/com.ibm.swg.im.mdmhs.sdfcintegration.doc/topics/c_mdmdrivenenrichment.html.

Human Data platform DataSift, https://datasift.com/platform/#normalize.

Guo et al., Linking Tweets to News A Framework to Enrich Short Text Data in Social Media, Proceedings of the 51st Annual Meeting of the Association for Computational Linguistics (vol. 1: Long Papers), Aug. 2013.

Gomadam et al., Data Enrichment Using Data Sources on the Web, AAAI Technical Report SS-12-04, Intelligent Web Services Meet Social Computing, pp. 34-38.

Gnip—Data collector, https://gnip.com/realtime/data-collector/, Mar. 18, 2016.

Data Collector Overview, http://support.gnip.com/apis/data_collector/overview.html.

Case Study: MutualMind, How MutualMind Accelerated the Market Launch of Its Cutting Edge Social Listening, Management and Engagement Solution.

\* cited by examiner

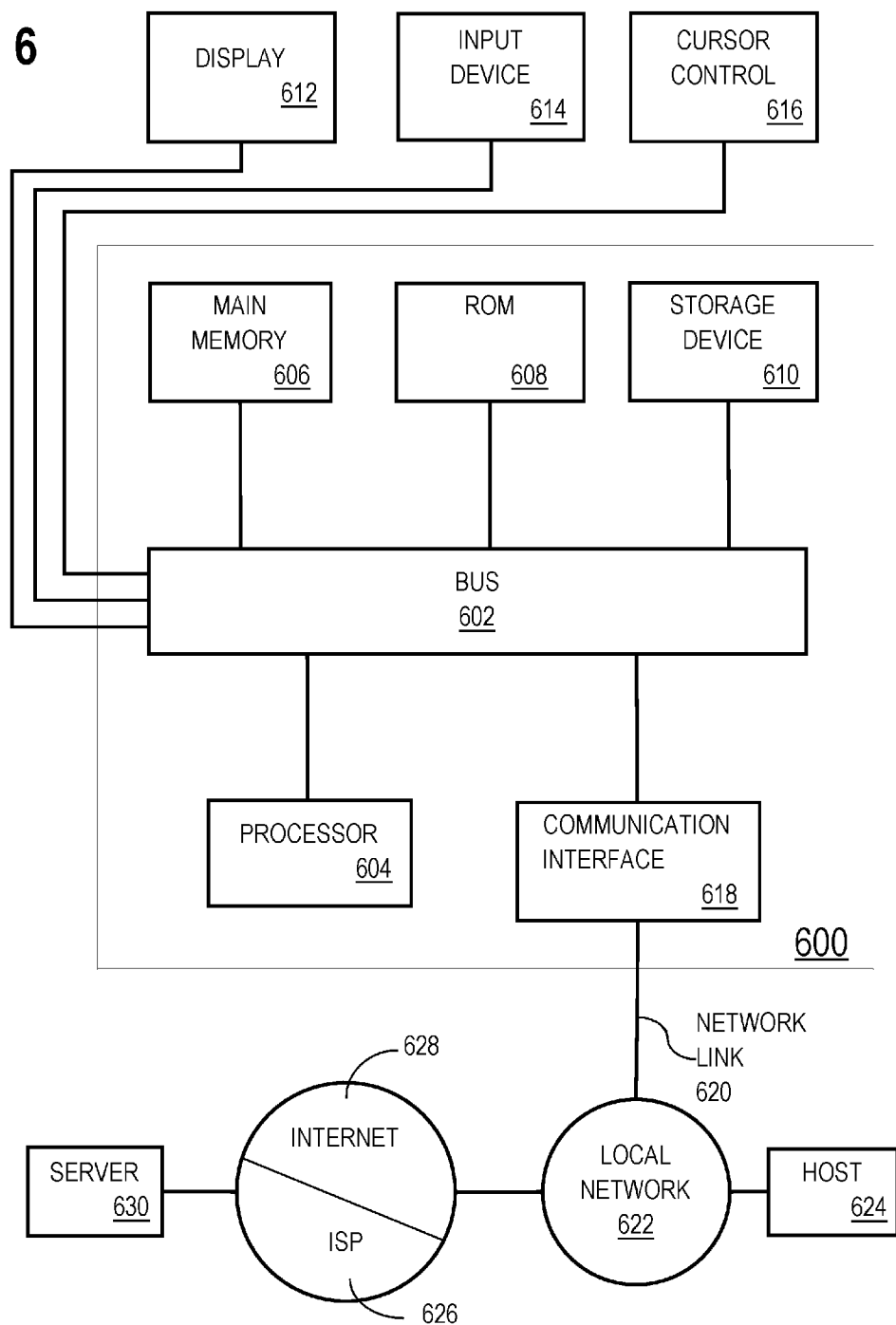

GENERATING FEEDBACK FOR A TARGET CONTENT ITEM BASED ON PUBLISHED CONTENT ITEMS

TECHNICAL FIELD

The present disclosure relates to content items. In particular, the present disclosure relates to generating feedback for a target content item based on one or more published content items.

BACKGROUND

A content item may be published to a public forum, such as a social media platform, a website, a mobile application, a web application, and/or an online forum. Prior to publishing a content item, an author of the content item may modify the content item multiple times. After the content item is published, a particular number of users may view the content item. Users who have viewed the content item may also react to the content item, such as posting a comment regarding the content item, sharing the content item, following a hyperlink included in the content item, and/or purchasing a product advertised by the content item.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 shows a block diagram that illustrates a computer system in accordance with one or more embodiments.

DETAILED DESCRIPTION

Figure 1:
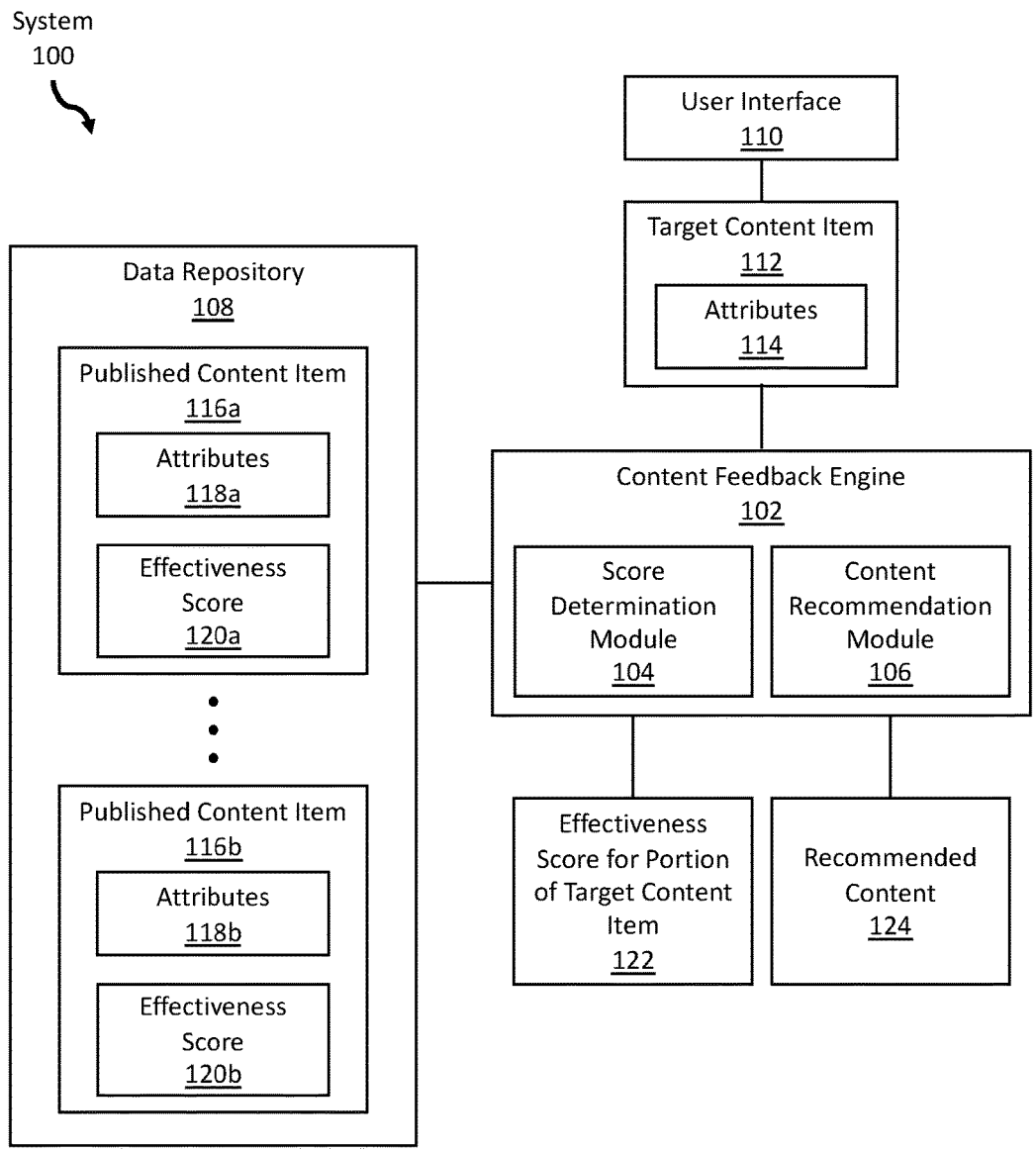
FIG. 1 illustrates a content feedback system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. CONTENT FEEDBACK SYSTEM ARCHITECTURE
3. DETERMINING AN EFFECTIVENESS SCORE FOR AT LEAST A PORTION OF A TARGET CONTENT ITEM
4. RECOMMENDING CONTENT TO BE ADDED TO AND/OR REMOVED FROM A TARGET CONTENT ITEM
5. EXAMPLE EMBODIMENTS
6. MISCELLANEOUS; EXTENSIONS
7. HARDWARE OVERVIEW

1. General Overview

One or more embodiments include determining an effectiveness score for a portion of a target content item that is being drafted. A content feedback engine identifies published content items with similar attributes as at least the portion of the target content item. The content feedback engine determines an effectiveness score of each published content item. The content feedback engine may determine an effectiveness score of a published content item based on, for example, a level of user engagement and/or user sentiment associated with the published content item. The content feedback engine determines an effectiveness score for the portion of the target content item based on the effectiveness scores of the published content items. The content feedback engine presents, on a graphical user interface, a graphical indication that marks the portion of the target content item based on the effectiveness score for the portion of the target content item. The content feedback engine may determine effectiveness scores for multiple portions of the target content item. The content feedback engine may present different graphical indications marking different portions of the target content item based on the different effectiveness scores associated with each portion. The content feedback engine may determine the effectiveness scores for one or more portions of the target content item while the target content item is being drafted.

One or more embodiments include recommending content to be added to and/or removed from a target content item. A content feedback engine identifies published content items with similar attributes as the target content item. The content feedback engine determines an effectiveness score of each published content item. The content feedback engine selects content from the published content items based on the respective effectiveness scores. The content feedback engine generates a recommendation for adding and/or removing the selected content to the target content item. Additionally or alternatively, the content feedback engine generates a recommendation for replacing current content in the target content item with content that is selected from the published content items. The content feedback engine may generate a recommendation for the target content item while the target content item is being drafted.

One or more embodiments described in this Specification and/or recited in the claims may not be included in this General Overview section.

2. Content Feedback System Architecture

FIG. 1 illustrates a content feedback system, in accordance with one or more embodiments. As illustrated in FIG.

1, a content feedback system 100 includes a user interface 110, a target content item 112, a content feedback engine 102, a data repository 108, an effectiveness score 122 for a portion of the target content item, and recommended content 124. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a target content item 112 is a content item for which feedback is being generated by a content feedback engine 102. The target content item 112 may be an uncompleted content item that is being drafted by a user. Additionally or alternatively, the target content item 112 may be a content item that has been published and is being modified by a user.

A target content item 112 may be published as a social post accessible to other users on a social networking platform. A social networking platform is any platform that allows users to communicate with each other. In an embodiment, a social networking platform is an online platform that is used by people to build social networks and/or social relations with other people who share similar personal or career interests, activities, backgrounds or real-life connections. Examples of social networking platforms include postings platforms, news platforms, discussion platforms, forums, webpages, and/or image or video sharing platforms.

A target content item 112 is associated with one or more attributes 114. An attribute 114 may be a component or portion of a target content item 112. Components of a target content item include, for example, text, images, references, and social handles. A reference is another content item that is mentioned in the target content item 112. The reference may be identified by a hyperlink or other identifier. A social handle is an identifier of a user and/or a user account of a social media platform.

An attribute may be associated with a particular component or portion of a target content item 112. Examples of attributes 114 include topics, labels, hashtags, and indicators associated with text and/or images included in a target content item 112. A topic is a general theme associated with the text and/or image. A label is a specific product, service, person, and/or item associated with the text and/or image. An indicator is an attitude and/or emotion conveyed by the text and/or image. As an example, a target content item may state, "Company A has launched an exciting new line of cars: Model XYZ." A topic associated with the text may be "Car." A label associated with the text may be "Model XYZ." An indicator associated with the text may be "Positive" or "Excitement." The topic, label, and indicator may be stored as attributes associated with the target content item.

Additionally or alternatively, examples of attributes 114 include geotags, locations, and timestamps associated with an image included in a target content item 112. A geotag is a tag indicating a geographical location at which the image was generated. A location is an environment and/or setting in which the image was generated. A timestamp indicates a time at which the image was generated. As an example, a target content item may include a photo of three people in Restaurant B. A geotag associated with the photo may indicate that the photo was captured at "37.58° N, 122.35° W." A location associated with the photo may be "Indoors" or "Restaurant."

Additionally or alternatively, examples of attributes 114 include a number of followers of a social handle included in a target content item 112. Further, examples of attributes 114 include topics associated with a social handle included in a target content item 112. As an example, a target content item may include the social handle, "@MaryAnn." "@MaryAnn" may be a social media account that has 10,000 followers. Further, "@MaryAnn" may be a social media account that includes postings about the software industry. An attribute of the social handle may be a number of followers of the "@MaryAnn" social media account, which is 10,000 is this example. Further, an attribute of the social handle may be a topic associated with the social handle, which is "Software Industry" in this example.

Additionally or alternatively, examples of attributes 114 include a number of viewers, a number of likes, and a number of comments associated with a reference included in a target content item 112. Further, examples of attributes 114 include an effectiveness score (such as effectiveness scores 120*a-b*) associated with a reference included in a target content item. Effectiveness scores 120*a-b* are further described below.

An attribute 114 may be related to how a target content item 112 is generated. An attribute 114 may be, for example, an author of a target content item 112, a time at which a target content item 112 was created, an application and/or device that is used to generate a target content item 112.

An attribute 114 may be a characteristic of a target audience of a target content item 112. Examples of characteristics of a target audience may include age, gender, demographics, geographical location, interests, and/or activity history. As an example, a target audience of a target content item may be women who have searched for baby products in the past thirty days. As another example, a target audience of a target content item may be persons located within the state of California.

In one or more embodiments, a user interface 110 refers to hardware and/or software configured to receive user input for generating, drafting, modifying, and/or publishing a target content item 112. The user interface 110 is configured to present graphical indications that mark portions of the target content item 112 based on effectiveness scores associated with the respective portions of the target content item 112. A user interface 110 renders user interface elements and receives user input via user interface elements. Examples of user interfaces 110 include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, and pages.

In one or more embodiments, a data repository 108 is any type of storage unit and/or device (e.g., a file system, database, collection of tables, or any other storage mechanism) for storing data. Further, a data repository 108 may include multiple different storage units and/or devices. The multiple different storage units and/or devices may or may not be of the same type or located at the same physical site. Further, a data repository 108 may be implemented or may execute on the same computing system as a content feedback engine 102. Alternatively or additionally, a data repository 108 may be implemented or executed on a computing system separate from a content feedback engine 102. A data repository 108 may be communicatively coupled to a content feedback engine 102 via a direct connection or via a network.

Information describing published content items 116*a-b* may be implemented across any of components within the system 100. However, this information is illustrated within the data repository 108 for purposes of clarity and explanation.

In one or more embodiments, a published content item (such as published content items 116*a-b*) is a content item that has been published. A content item may be published to a public forum, such as a social media platform, a website, a mobile application, a web application, and/or an online forum. A published content item may be a content item that was previously published by the same user that is drafting a target content item 112. Alternatively, a published content item may be a content item that was previously published by another user.

A published content item is associated with one or more attributes (such as attributes 118*a-b*). Examples of attributes are described above with reference to the attributes 114 associated with a target content item 112.

In addition to the examples described above, an attribute of a published content item may be a characteristic of a detected audience of the published content item. Characteristics of a detected audience of a published content item may be determined via monitoring cookies, user logins, and/or activities of users as users navigate through various websites and/or applications. Examples of characteristics of a detected audience may include age, gender, demographics, geographical location, interests, and/or activity history.

A published content item is associated with an effectiveness score (such as effectiveness scores 120*a-b*). An effectiveness score is based on an engagement score and/or a sentiment score, as described below.

In an embodiment, an effectiveness score is based on an engagement score. An engagement score is a measure of a level of engagement associated with a published content item. The level of engagement may be based on, for example, a number of viewers of the content item, a number of likes associated with the content item, a number of comments associated with the content item, a number of users who shared the content item, and/or a number of users who took an action in association with the content item. An action associated with the content item may include, for example, clicking on a hyperlink included in the content item, and/or purchasing a product described by the content item.

In an embodiment, an effectiveness score is based on a sentiment score. A sentiment score is a measure of a level of sentiment associated with a published content item. Sentiment refers to an attitude, emotion, and/or opinion of viewers of the published content item. The level of sentiment is determined by monitoring a user response and/or reaction to a published content item. Based on the user response and/or reaction, a sentiment score associated with the published content item may indicate a positive attitude or a negative attitude towards the published content item.

The level of sentiment may be determined based on, for example, whether the comments on a published content item are positive or negative, and/or whether the published content item is being shared in a positive or negative manner. Additionally or alternatively, the level of sentiment may be determined based on a user's discussion with others subsequent to the user viewing the published content item. The comments, shares, and/or discussions associated with the content item may include text, images, emoticons, and/or other content. As an example, a published content item may state, "Chicken nuggets for only $10.99." A user response may include a sad face emoticon. A comment to the published content item may state, "I would never buy chicken nuggets at that price." Another comment may state, "That is not a deal at all." Based on the comments, a sentiment score associated with the published content item may indicate a negative attitude towards the published content item. As another example, a user may transmit a message that includes a reference to a published content item to a friend. The message may include a smile emoticon and a suggestion for the friend to read the published content item. Alternatively, the message may include an angry emoticon and state "I can't believe how ridiculous this is." Based on the messages, a content feedback engine may determine a sentiment score associated with the published content item.

The level of sentiment may be determined based on, for example, a physical reaction of a user. As an example, a content feedback engine may be configured to translate user behavior captured by a webcam to user sentiment. As an example, video captured by a webcam may be analyzed to determine that a user was frowning while reading published content. Based on the frown, a content feedback engine may determine a sentiment score of 2 out of 5. User behavior which may be translated to a sentiment score includes, but is not limited to, user posture (e.g., slouching or leaning forward) and facial expressions (e.g., smiling, screaming, grimacing, laughing, yelling, etc.).

In an embodiment, an effectiveness score is a combination of an engagement score and a sentiment score. As an example, an effectiveness score may an average of an engagement score and a sentiment score. As another example, an effectiveness score may be a weighted combination of the engagement score and the sentiment score. The weight assigned to each of the engagement score and the sentiment score may depend, for example, on how much relevant data was gathered for the determining the engagement score and the sentiment score, respectively.

In one or more embodiments, a content feedback engine 102 includes a score determination module 104 and a content recommendation module 106. In an embodiment, a content feedback engine 102 may include one module without including the other module. In an embodiment, the two modules may be combined as one module or component.

In an embodiment, a score determination module 104 refers to hardware and/or software configured to perform operations described herein for determining an effectiveness score 122 for at least a portion of a target content item 112. The effectiveness score 122 for at least the portion of the target content item 112 may be determined based on multiple effectiveness scores corresponding to multiple published content items. Examples of operations for determining an effectiveness score for at least a portion of a target content item are described below with reference to FIG. 2. As illustrated, the effectiveness score 122 for a portion of a target content item 112 predicts how effective a hypothetical content item, having the portion of the target content item, would be as a social post accessible to other users on at least one social networking platform. The hypothetical content item may be, for example, the target content item (including the portion), the portion of the target content item posted by itself, and/or content from published content items having the first portion.

In an embodiment, a content recommendation module 106 refers to hardware and/or software configured to perform operations described herein for recommending content 124 to be added to and/or removed from a target content item 112. Examples of operations for recommending content are described below with reference to FIG. 3. As illustrated, recommended content 124 is content that is recommended for being added to a target content item 112.

In an embodiment, a content feedback engine 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant ("PDA").

Figure 2:
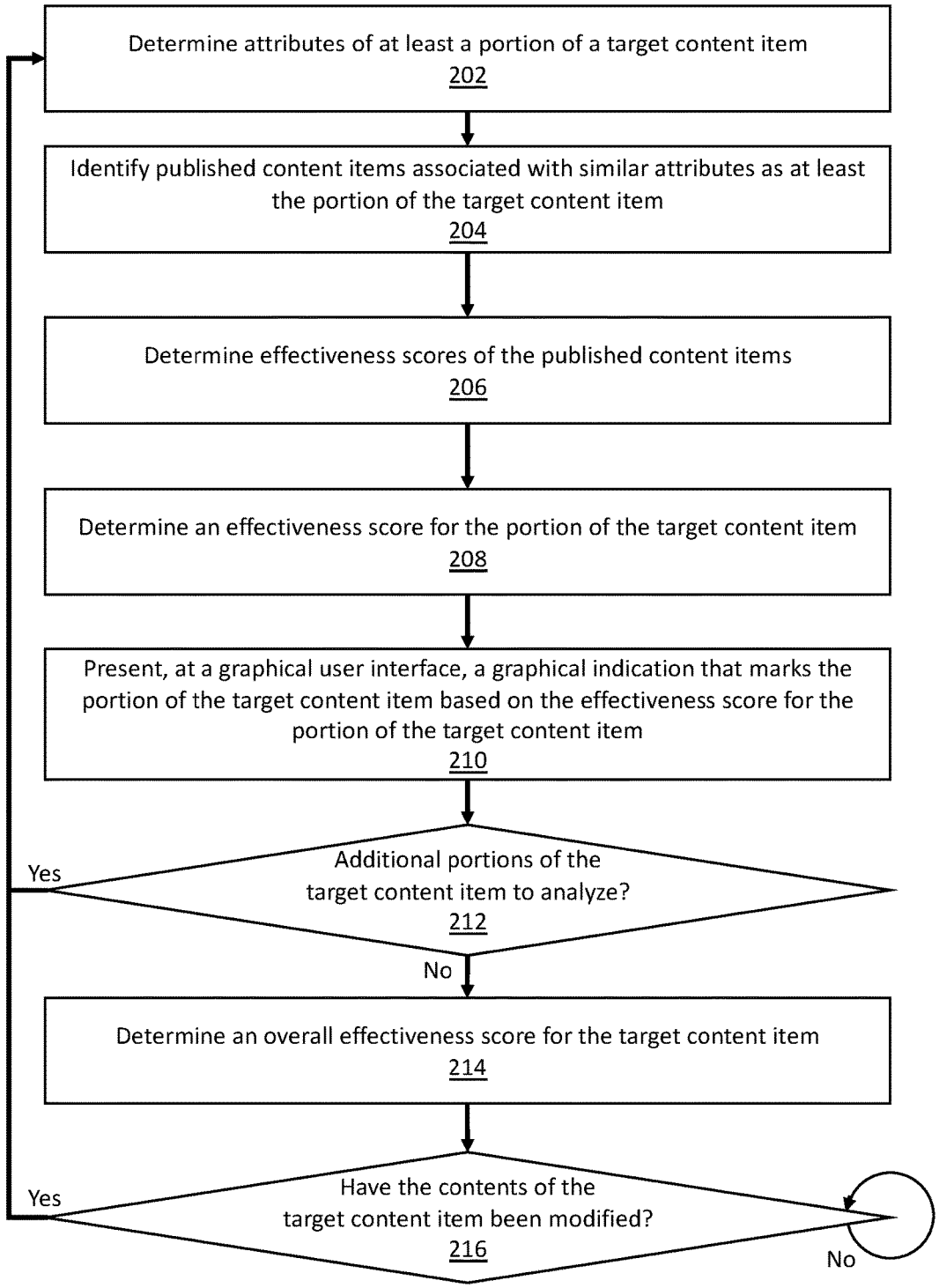
FIG. 2 illustrates an example set of operations for determining an effectiveness score for at least a portion of a target content item, in accordance with one or more embodiments.

3. Determining an Effectiveness Score for at Least a Portion of a Target Content Item FIG. 2 illustrates an example set of operations for determining an effectiveness score for at least a portion of a target content item, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments. The operations illustrated in FIG. 2 may be performed by a content feedback engine 102, a score determination module 104, another component or module, and/or a combination thereof.

One or more embodiments include determining attributes of at least a portion of a target content item (Operation 202). A content feedback engine 102 (and/or a score determination module 104 thereof) obtains the target content item. The target content item is received from a user interface. The target content item may be an incomplete piece of content. As an example, the target content item may include only half of a paragraph. As another example, the target content item may include an incomplete sentence. The content feedback engine 102 may obtain a current version of the target content item, while a user continues to draft and/or modify the target content item.

The content feedback engine 102 identifies one or more of the following components of the target content item: text, images, references, and social handles. Additional and/or alternative components of the target content item may be identified.

In an embodiment, the content feedback engine 102 analyzes the text to determine topics, labels, indicators, and/or other attributes associated with the text. The content feedback engine 102 may determine attributes associated with the text by performing natural language processing and/or semantic analysis. The content feedback engine 102 may further analyze the text based on a library and/or table of existing topics, labels, and indicators. The content feedback engine 102 may find that topics, labels, and indicators in the library appear within the text. The content feedback engine 102 determines that the topics, labels, and indicators found within the text are attributes associated with the text.

As an example, a target content item may state, "The Model XYZ smartphone is loaded with the best camera and the best speakers." A content feedback engine may parse the text to determine the grammatical components of the text. Based on the parsing, the content feedback engine 102 may identify "Model XYZ smartphone" as the subject of the sentence. The content feedback engine 102 may compare "Model XYZ smartphone" to a library of existing topics and labels. The library may include the topic "Smartphone." The library may include the label "Model XYZ." The library may also indicate that the label "Model XYZ" is associated with another label "Company A," which is the company that produces Model XYZ smartphone. Based on the library, the content feedback engine may determine that the text is associated with the topic "Smartphone," the label "Model XYZ," and the label "Company A."

In an embodiment, the content feedback engine 102 analyzes an image in the target content item to determine topics, labels, indicators, and/or other attributes associated with the image. The content feedback engine 102 analyzes the image to identify objects, places, and/or persons in the image. The content feedback engine 102 compares the image to a library of known objects, places, and/or persons. Each of the known objects, places, and/or persons are tagged with topics, labels, and/or indicators. The content feedback engine determines a match between the image in the target content item and a particular image in the library. The content feedback engine 102 determines that the topics, labels, and/or indicators associated with the particular image in the library are attributes associated with the image in the target content item.

As an example, an image may show a face of a person. A content feedback engine 102 may compare the image to a library of known faces. Based on the comparison, the content feedback engine 102 may identify the face in the image as that of Mary Smith. The content feedback engine 102 may determine that a label associated with the image is "Mary Smith." Additionally, the content feedback engine 102 may determine that the face in the image is smiling. The content feedback engine 102 may determine that an indicator associated with the image is "Positive."

Additionally or alternatively, the content feedback engine 102 analyzes the image to determine a geotag, a location, and a timestamp associated with the image. The content feedback engine 102 obtains a geotag and/or a timestamp associated with the image. Further, the content feedback engine 102 analyzes the image to determine a setting and/or environment depicted in the image. As an example, an image may show an outdoor scene under bright sunlight. Based on an analysis of the colors included in the image, a content feedback engine 102 may determine that the image is bright. The content feedback engine 102 may determine that the image depicts a bright outdoor setting.

In an embodiment, the content feedback engine 102 analyzes a social handle included in the target content item to determine attributes associated with the social handle. The content feedback engine 102 identifies a social media platform associated with the social handle. The content feedback engine 102 determines a number of followers of the social handle from the social media platform. The number of followers is an attribute associated with the social handle. Further, the content feedback engine 102 identifies postings generated using the social handle from the social media platform. The content feedback engine 102 analyzes the postings to determine topics, labels, and indicators associated with the postings. The content feedback engine 102 identifies the topics, labels, and indicators as attributes associated with the social handle.

In an embodiment, the content feedback engine 102 analyzes a reference included in the target content item to determine attributes associated with the reference. The reference may be identified by hyperlink, a file location, and/or other identifier. The content feedback engine 102 retrieves the reference from a website and/or server. The content feedback engine 102 determines a number of viewers, a number of likes, and a number of comments associated with the reference. The content feedback engine 102 identifies the number of viewers, the number of likes, and the number of comments as attributes associated with the reference.

One or more embodiments include identifying published content items associated with similar attributes as at least the portion of the target content item (Operation 204). The content feedback engine 102 analyzes published content items stored in one or more data repositories. The content feedback engine 102 determines attributes associated with each published content item. Examples for determining attributes associated with a content item are described above with reference to Operation 202.

The content feedback engine identifies a subset of the published content items that are associated with similar attributes as the target content item. Examples for identifying published content items associated with similar attributes as the target content item are described below. Additional and/or alternative methods for identifying published content items associated with similar attributes as the target content item may be used.

In an embodiment, the content feedback engine determines a number of common attributes between the target content item and each published content item. The content feedback engine selects the published content items associated with the highest numbers of common attributes. Additionally or alternatively, the content feedback engine compares the number of common attributes associated with each published content item with a minimum threshold. The content feedback engine selects each published content item associated with a number of common attributes above the minimum threshold.

As an example, a target content item may be a car advertisement to be published by Toyota. The target content item may include an image that shows an aerial view of a yellow car on a curvy road on a cliff. A published car advertisement by Audi may include a curvy road and a cliff. A published car advertisement by BMW may include a yellow car. A published car advertisement by Honda may include an aerial view of a car. Based on the common attributes between the three published car advertisements and the target content item, a content feedback engine may determine that the three published car advertisements are associated with similar attributes as the target content item.

In an embodiment, the content feedback engine determines characteristics of a detected audience of each published content item. The content feedback engine compares the characteristics of a detected audience of a published content item to the characteristics of a target audience for the target content item. The content feedback engine determines a level of similarity between the characteristics of the detected audience and the characteristics of the target audience. The content feedback engine selects the published content item based on the level of similarity.

In an embodiment, the content feedback engine determines a score for each published content item. The content feedback engine compares the attributes associated with the target content item with the attributes associated with a published content item. The content feedback engine determines a level of similarity between the attributes. The content feedback engine determines a score for the published content item based on the level of similarity between the attributes. The content feedback engine selects the published content items associated with the highest scores. Additionally or alternatively, the content feedback engine selects the published content items associated with scores above a minimum threshold.

As an example, a target content item may be associated with the topics, "Car" and "Gas Efficiency." A published content item may be associated with the topics, "Truck" and "Gas Efficiency." A content feedback engine determines that the topic "Gas Efficiency" is common to both content items. The level of similarity between the attributes may be determined as 1.0. The content feedback engine determines that the topic "Car" is related to the topic "Truck." The level of similarity between the attributes may be determined as 0.8. The content feedback engine may determine that the overall level of similarity between the attributes is 0.9 (an average of the two individual levels of similarity). Based on the overall level of similarity, the content feedback engine may determine a score for the published content item. The content feedback engine may determine that the score is above a minimum threshold. The content feedback engine may select the published content item.

In an embodiment, the content feedback engine identifies a subset of the published content items that are associated with similar attributes as the target content item based on a context associated with the target content item. As an example, a target content item may describe a car named "Malibu." However, the word "Malibu" may also refer to a particular beach in California. A content feedback engine may analyze the target content item to determine a context of the target content item. The content feedback engine may determine that the target content item describes cars and driving. A particular set of published content items may be associated with the attribute, "Malibu." The content feedback engine may select only a subset of the published content items that are associated with the context of cars and driving.

In an embodiment, the content feedback engine identifies a subset of the published content items that include the same word or phrase, image, reference, and/or social handle as a particular portion of the target content item. The content feedback engine identifies the subset of published content items that include both (a) the same word or phrase, image, reference, and/or social handle as a particular portion of the target content item and (b) share similar attributes as one or more other portions of the target content item.

As an example, one published content item may be an advertisement for a printer. The printer advertisement may state, "Printer A prints at a very high speed." Another content item may be an advertisement for cars. The car advertisement may state, "Go for speed. Go for Model XYZ." Meanwhile, a target content item may state, "Our new Printer B prints with exceptional clarity and exceptional speed."

A content feedback engine may determine that a topic associated with the printer advertisement is printers, a topic associated with the car advertisement is cars, and a topic associated with the target content item is printers. The content feedback engine may also determine that the printer advertisement, the car advertisement, and the target content item all include the word "speed."

The content feedback engine may identify published content items associated similar attributes as the portion, "speed," of the target content item. Even though both advertisements include the word "speed," the printer advertisement is associated with the same topic as the target content item, while the car advertisement is associated with a different topic than the target content item. Hence, the content feedback engine may select the printer advertisement but not the car advertisement.

One or more embodiments include determining effectiveness scores of the published content items (Operation 206). As described above with reference to effectiveness scores 120*a-b* of FIG. 1, an effectiveness score may be based on an engagement score and/or a sentiment score.

In an embodiment, the content feedback engine determines an engagement score of a published content item. The engagement score may be determined based on statistics associated with the published content item, such as a number of viewers of the published content item, a number of likes associated with the content item, a number of comments associated with the content item, a number of users who shared the content item, a number of users who clicked on a hyperlink included in the content item, and/or a number of users who purchased a product advertised by the content item.

A webpage or application may concurrently display the published content item and the most current statistics for the published content item. The content feedback engine may obtain the most current statistics from the webpage or application displaying the published content item. As an example, a top section of a webpage may display a published content item. A bottom section of the webpage may display the number of likes received for the published content item. Each time a viewer clicks a "Like" button, the number of likes shown on the bottom section may be incremented. A content feedback engine may request to load the webpage displaying the published content item. The content feedback engine may determine the number of likes received for the published content item from the webpage.

A server hosting the published content item track may track the statistics associated with the published content item. The content feedback engine may transmit a request for the most current statistics to the server. The content feedback engine may receive a response from the server including the most current statistics.

After determining the statistics associated with the published content item, the content feedback engine applies a particular function to the statistics to determine an engagement score. As an example, each statistic may be associated with a particular weight. Statistics that reflect a greater degree of engagement may be associated with a greater weight. For example, the statistic for the number of users who purchased a product may be associated with a greater weight. The statistic for the number of viewers may be associated with a lesser weight. An engagement score may be a weighted sum computed based on the statistics.

An engagement score may be determined based on a time period in which the engagement with a published content item occurred. As an example, a published content item may have received 50 comments in the past thirty days. The published content item may have received 1,000 comments over thirty days ago. A content feedback engine may apply a weight of 0.8 to the more recent comments. The content feedback engine may apply a weight of 0.2 to the older comments. The content feedback engine may compute a weighted sum as follows, (0.8×50)+(0.2×1,000). The result may be 240. The content feedback engine may determine 240 as the engagement score of the published content item.

In an embodiment, the content feedback engine determines a sentiment score of a published content item. The sentiment score may be determined based on whether the comments on the published content item are positive or negative, and/or whether the published content item is being shared in a positive or negative manner.

The content feedback engine obtains comments associated with the published content item. A webpage or application may concurrently display the published content item and the comments received for the published content item. The content feedback engine may obtain the comments from the webpage or application displaying the published content item. As an example, a top section of a webpage may display a published content item. A bottom section of the webpage may display the comments received for the published content item. A content feedback engine may request to load the webpage displaying the published content item. The content feedback engine may obtain the comments received for the published content item from the webpage.

The content feedback engine obtains shares associated with the published content item. A share associated with a particular published content item is another published content item that mentions and/or references the particular published content item. A server hosting the published content item may monitor the shares associated with the published content item. The content feedback engine may query the server for the shares associated with the published content item. Additionally or alternatively, the content feedback engine may search through other published content items to find mentions of the published content item.

After obtaining the comments and/or shares associated with the published content item, the content feedback engine analyzes the comments and/or shares to determine whether the comments and/or shares are positive or negative. Positive comments and/or shares result in a high sentiment score. Negative comments and/or shares result in a low sentiment score. The content feedback engine may analyze the comments and/or shares by performing a natural language analysis and/or a semantic analysis. Additionally or alternatively, the content feedback engine may analyze the comments and/or shares by detecting certain keywords in the comments and/or shares.

As an example, a list of keywords may include "hate," "dislike," "love," and "funny." The words "hate" and "dislike" may be marked as being negative. The words "love" and "funny" may be marked as being positive. A content feedback engine may scan through the comments on a published content item to identify the keywords. The content feedback engine may determine the number of positive keywords appearing in the comments. The content feedback engine may determine the number of negative keywords appearing in the comments. The content feedback engine may determine a sentiment score based on the number of positive keywords and the number of negative keywords appearing in the comments.

In an embodiment, the content feedback engine determines a combination of an engagement score and a sentiment score. The combination may be based on an average of the engagement score and the sentiment score. Additionally or alternatively, the combination may be based on other functions applied to the engagement score and the sentiment score.

As an example, a content feedback engine may determine an engagement score and a sentiment score for a published content item. The content feedback engine may compute an average of the engagement score and the sentiment score. The content feedback engine may determine three effectiveness scores associated with the published content item: the engagement score, the sentiment score, and the average thereof.

One or more embodiments include determining an effectiveness score for the portion of the target content item (Operation 208). The content feedback engine determines the effectiveness score for the portion of the target content item based on the effectiveness scores of the published content items determined at Operation 206.

As an example, a content feedback engine may determine the effectiveness scores of published content items associated with similar attributes as a target content item. The content feedback engine may compute an average of the effectiveness scores. The content feedback engine may predict that the effectiveness score for the portion of the target content item is the average of the effectiveness scores of the published content items.

The effectiveness score for the portion of the target content item may be determined based on a time period in which the published content items were published. A greater weight may be applied to an effectiveness score of a more recent published content item. A lesser weight may be applied to an effectiveness score of an older published content item. As an example, a target content item may be a car advertisement to be published by Toyota. The target content item may include an image of a windy road in a forest. Published content items with similar attributes as the target content item and an image of a windy road in a forest may be: a car advertisement by Audi, a car advertisement by BMW, and a car advertisement by Honda. The Audi advertisement, the BMW advertisement, and the Honda advertisement may have effectiveness scores of 60, 50, and 70, respectively. The Honda advertisement may be the oldest published item. The BMW advertisement may be the next published item. The Honda advertisement may be the most recent published item. Based on the chronological ordering of the published content items, a content feedback engine may apply the weights, 0.5, 0.3, and 0.2, respectively to the effectiveness scores of the Audi advertisement, the BMW advertisement, and the Honda advertisement. The content feedback engine may compute a weighted sum as follows, (0.5×60)+(0.3×50)+(0.2×70). The result may be 59. The content feedback engine may determine that the effectiveness score for the image of the windy road in the forest, in the target content item to be published by Toyota, is 59.

One or more embodiments include presenting, at a graphical user interface, a graphical indication that marks the portion of the target content item based on the effectiveness score for the portion of the target content item (Operation 210). The content feedback engine 102 determines the graphical indication based on the effectiveness score for the portion of the target content item. The content feedback engine 102 may obtain a set of candidate graphical indications from a data repository. Each candidate graphical indication corresponds to a range of effectiveness scores. Based on the effectiveness score for the portion of the target content item determined at Operation 208, the content feedback engine 102 selects one of the candidate graphical indications.

The content feedback engine 102 displays the graphical indication concurrently with the target content item, as the target content item is being drafted. The content feedback engine 102 presents a graphical indication that marks the portion of the target content item based on the effectiveness score associated with the portion of the target content item, without marking other portions of the target content item based on the effectiveness score associated with the portion of the target content item.

As an example, candidate graphical indications that may be used include a red circle and a green circle. The red circle corresponds to effectiveness scores greater than or equal to 50. The green circle corresponds to effectiveness scores less than 50. A content feedback engine may determine that the word "speed" in a target content item has an effectiveness score of 59. Based on the effectiveness score of 59, the content feedback engine presents a red circle around the word "speed" in the target content item.

Examples of graphical indications include using different colors, shapes, animations, labels, and/or other marks based on different effectiveness scores. As an example, a red circle corresponds to effectiveness scores between 0 and 30, a blue circle corresponds to effectiveness scores between 30 and 60, and a green circle corresponds to effectiveness scores between 60 and 100. As an example, changing the color of text to red corresponds to effectiveness scores between 0 and 50, and changing the color of text to green corresponds to effectiveness scores between 50 and 100. As another example, marking an image with a cross corresponds to effectiveness scores between 0 and 50, and marking an image with a checkmark corresponds to effectiveness scores between 50 and 100. As another example, flashing a portion of a target content item corresponds to effectiveness scores between 0 and 30, and displaying the portion without flashing corresponds to effectiveness scores between 30 and 100.

In an embodiment, the content feedback engine 102 selects the graphical indication to be presented based on the effectiveness score for the portion of the target content item as well as other information. As an example, a content feedback engine may select the graphical indication to be used based on the effectiveness score for the portion of the target content item as well as the identity of the user who is drafting the target content item. One user may be a famous blogger who has many followers. Another user may be an amateur blogger with fewer followers. The content feedback engine may select different graphical indications for the same portion of the same target content item, based on whether the target content item is being drafted by the famous blogger or the amateur blogger.

One or more embodiments include determining whether there are additional portions of the target content item to analyze (Operation 212). The content feedback engine 102 identifies another portion of the target content item. The content feedback engine 102 may identify portions for analysis based on semantic analysis, a context of the target content item, and/or other information. The content feedback engine 102 may determine that common words, such as "a," "the," and "since," are to be excluded from analysis. Additionally or alternatively, the content feedback engine 102 may determine that words that are commonly used in a particular industry should be analyzed. As an example, a target content item may be a car advertisement. A content feedback engine may determine words that are commonly used in the car industry from a data repository. The words that are commonly include may include: "speed," "efficiency," and "power." The content feedback content may determine that the target content item includes the phrase, "The new Model X is highly gas-efficient." The content feedback engine may determine that the phrase "gas-efficient" is a portion to be analyzed.

If there is an additional portion to analyze, the content feedback engine 102 iterates Operations 202-212 with respect to the additional portion. The content feedback engine 102 may concurrently present different graphical indications marking different portions of the same target content item. As an example, a target content item may include the phrase, "The new Model X is highly gas-efficient." A content feedback engine may determine that an effectiveness score for "gas-efficient" is 65, while an effectiveness score for "highly" is 30. Based on the different effectiveness scores for the different portions, the content feedback engine may present the phrase "gas-efficient" in green text, and the word "highly" in red text.

If there are no additional portions to analyze, one or more embodiments include determining an overall effectiveness score for the target content item (Operation 214). The content feedback engine 102 determines the overall effectiveness score for the target content item based on effectiveness scores corresponding to one or more portions of the target content item.

As an example, a target content item may be a car advertisement, including the text, "The new Model X is highly gas-efficient." A content feedback engine may determine an effectiveness score for the word "gas-efficient." The content feedback engine may identify published car advertisements including the word "gas-efficient." The content feedback engine may determine engagement scores for each of the published car advertisements. The content feedback engine may determine a first effectiveness score for the word "gas-efficient," in the target content item, based on the engagement scores of the published car advertisements. Additionally, the content feedback engine may determine sentiment scores for each of the published car advertisements. The content feedback engine may determine a second effectiveness score for the word "gas-efficient," in the target content item, based on the sentiment scores of the published car advertisements. The content feedback engine may determine an overall effectiveness score, for the target content item, based on the first effectiveness score for the word "gas-efficient" and the second effectiveness score for the word "gas-efficient." The overall effectiveness score may be, for example, an average of the first effectiveness score and the second effectiveness score.

As an example, a target content item may be a car advertisement, including the text, "The new Model X is highly gas-efficient." A content feedback engine may determine an effectiveness score for the word "gas-efficient." The content feedback engine may identify a first set of published car advertisements including the word "gas-efficient." The content feedback engine may determine engagement scores for each of the first set of published car advertisements. The content feedback engine may determine a first effectiveness score for the word "gas-efficient," in the target content item, based on the engagement scores of the first set of published car advertisements. Additionally, the content feedback engine may identify a second set of published car advertisements including the word "highly." The content feedback engine may determine engagement scores for each of the second set of published car advertisements. The content feedback engine may determine a second effectiveness score for the word "highly," in the target content item, based on the engagement scores of the second set of published car advertisements. The content feedback engine may determine an overall effectiveness score based on the first effectiveness score for the word "gas-efficient" and the second effectiveness score for the word "highly."

The content feedback engine 102 may display the overall effectiveness score for the target content item as the target content item is being drafted. As an example, a user interface for generating and/or modifying a target content item may be presented. A bottom section of the user interface may be configured to display a current version of the target content item. The bottom section is also configured to receive user input specifying and/or modifying the contents of the target content item. A top section of the user interface may be configured to display an overall effectiveness score for the target content item.

As described above with reference to Operation 208, an effectiveness score for a portion of the target content item is determined. In an embodiment, the content feedback engine 102 presents the overall effectiveness score for the target content item including the portion as compared to the overall effectiveness score of the target content item without the portion.

One or more embodiments include determining whether the contents of the target content item have been modified (Operation 216). A user may continue to modify the target content item as the content feedback engine 102 performs Operations 202-214. If the user has modified the target content item, then the content feedback engine 102 reiterates Operations 202-214 with respect to the modified target content item. Hence, a content feedback engine 102 may determine effectiveness scores for portions of a target content item as the target content item is being drafted.

As an example, a user may begin to draft a target content item. An initial version of the target content item may state, "Get the best pizza at Pizza House!" A content feedback engine may perform Operations 202-214 based on the initial version of the target content item. The content feedback engine may determine effectiveness scores for portions of the initial version of the target content item. While Operations 202-214 are being performed with respect to the initial version of the target content item, the user may add an image of a pizza to the target content item. A second version of the target content item may include: (a) the text "Get the best pizza at Pizza House!" and (b) the pizza image. The content feedback engine may reiterate Operations 202-214 based on the second version of the target content item. The content feedback engine may determine an effectiveness score for portions of the second version of the target content item. The user may continue to modify the target content item. The content feedback engine may determine effectiveness scores for portions of the target content item as the target content item is being modified.

In an embodiment, a content feedback engine 102 performs Operations 202-214 on a target content item that has been published. The content feedback engine 102 performs Operations 202-214 in order to estimate an effectiveness score for the target content item and/or a portion thereof. The content feedback engine 102 estimates an effectiveness score for at least a portion of the target content item based on the effectiveness scores of other published content items. The effectiveness scores of the other published content items are determined based on, for example, a level of user engagement and/or user sentiment associated with the other published content items. The content feedback engine 102 may not necessarily have sufficient monitoring data for determining the effectiveness score for the target content item based on the level of user engagement and/or user sentiment associated with the target content item itself.

Figure 3:
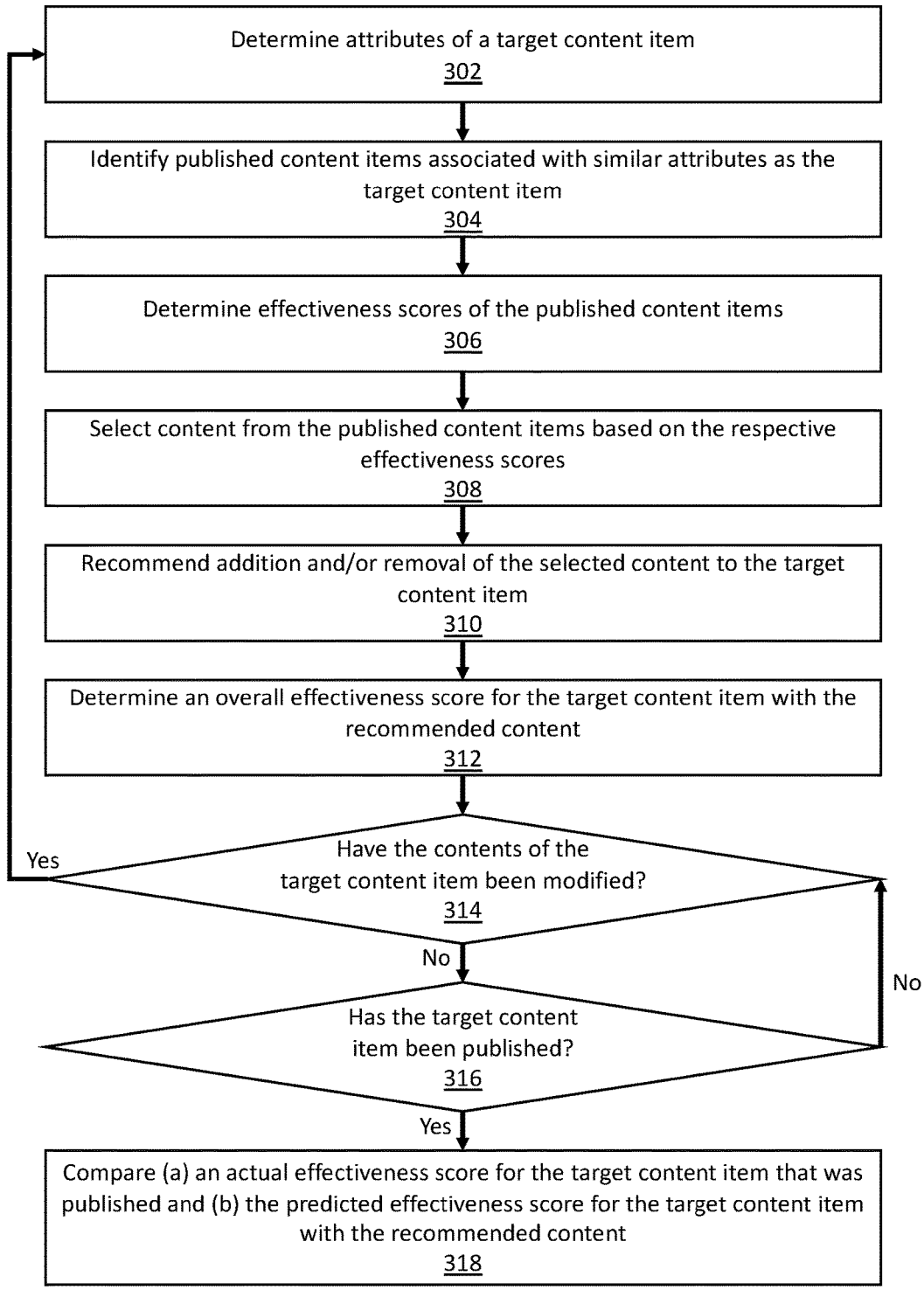
FIG. 3 illustrates an example set of operations for recommending content to be added to and/or removed from a target content item, in accordance with one or more embodiments.

4. Recommending Content to be Added to and/or Removed from a Target Content Item FIG. 3 illustrates an example set of operations for recommending content to be added to and/or removed from a target content item, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments. The operations illustrated in FIG. 3 may be performed by a content feedback engine 102, a content recommendation module 106, another component or module, and/or a combination thereof.

One or more embodiments include determining attributes of a target content item (Operation 302). Examples for determining attributes of a content item are described above with reference to Operation 202. The target content item may be a content item that is being drafted. Additionally or alternatively, the target content item may be a content item that has been published.

One or more embodiments include identifying published content items associated with similar attributes as the target content item (Operation 304). Examples for identifying published content items associated with similar attributes as the target content item are described above with reference to Operation 204.

One or more embodiments include determining effectiveness scores of the published content items (Operation 306). Examples for determining effectiveness scores of the published content items are described above with reference to Operation 206.

One or more embodiments include selecting content from the published content items based on the respective effectiveness scores (Operation 308). A content feedback engine 102 (and/or a content recommendation module 106 thereof) selects a subset of the published content items based on the respective effectiveness scores. The content feedback engine 102 may select published content items that are associated with the highest effectiveness scores. Additionally or alternatively, the content feedback engine 102 may select published content items that are associated with effectiveness scores that are above a specified threshold.

The content feedback engine 102 compares the selected subset of published content items to identify common content included in the selected subset of published content. The selected subset of published content may include, for example, a same word, image, social handle, reference, topic, and/or hashtag. The content feedback engine 102 selects the common content to be included in a recommendation for the target content item. As an example, a content feedback engine may determine that each of a selected subset of published content items includes a social handle, "@John_Smith." The content feedback engine may select "@John_Smith" as content to be recommended for a target content item. As an example, a content feedback engine may determine that each of a selected subset of published content items includes a topic, "#new_year." The content feedback engine may select #new_year" as content to be recommended for a target content item.

The content feedback engine 102 compares the selected subset of published content items to identify common attributes associated with the subset of published content items. The selected subset of published content may be associated with, for example, a same topic, label, hashtag, and/or geotag. The content feedback engine 102 identifies content associated with the common attributes. The content feedback engine 102 selects the content to be included in a recommendation for the target content item.

As an example, a content feedback engine may identify a set of published content items associated with similar attributes as a target content item. A subset of the published content items associated with the highest effectiveness scores may include Published Content Item A and Published Content Item B. Published Content Item A may state, "The best place for a summer vacation is Hawaii." Published Content Item B may state, "Tahoe is ski heaven." The two published content items do not share any common content. However, both published content items may be associated with a common attribute, the topic "Vacation." The content feedback engine may identify content associated with the topic "Vacation," such as the text "memorable vacation," and an image of a relaxed person. The content feedback engine may recommend adding the content to the target content item.

The content feedback engine 102 selects a subset of published content items that are associated with relatively low effectiveness scores. The content feedback engine 102 identifies common content and/or attributes associated with the subset of published content items with low effectiveness scores. The content feedback engine 102 recommends removing, from the target content item, the content and/or attributes that are common to the published content items with low effectiveness scores.

As an example, a target content item may state, "Company MedDevice is introducing a new medical stent." A published content item with similar attributes as the target content item may state, "A new pacemaker, introduced by Company HeartCare, is available on the market." Another published content item with similar attributes as the target content item may state, "With the exciting launch of the new medical machine, Company HealthMachine is making significant advancements in improving patient health." A content feedback engine may determine that an effectiveness score of the Company HeartCare content item is low, and an effectiveness score of the Company HealthMachine content item is high. The content feedback engine may determine that the word "introduce" is associated with a low effectiveness score. The content feedback engine may determine that the words "launch" and "exciting" are associated with a high effectiveness score. The content feedback engine may recommend adding the text "launch" and "exciting" to the target content item. The content feedback engine may recommend replacing the text, "Company MedDevice is introducing a new medical stent" with "Company MedDevice is launching a exciting new medical stent."

One or more embodiments include recommending addition and/or removal of the selected content to the target content item (Operation 310). The content feedback engine 102 generates a recommendation for adding the selected content to the target content item. Additionally or alternatively, the content feedback engine 102 generates a recommendation for removing the selected content from the target content item. Additionally or alternatively, the content feedback engine 102 generates a recommendation for replacing current content, in the target content item, with content selected from published content items.

The content feedback engine 102 may cause the recommendation to be displayed to the side of the target content item. The recommendation may include an arrow pointing to a particular location in the target content item at which the content should be added. As an example, a user interface for generating and/or modifying a target content item may be presented. A central section of the user interface may be configured to receive user input specifying the contents of the target content item. A side section of the user interface may be configured to display one or more recommendations.

The content feedback engine 102 may cause the recommendation to be displayed at a particular location within the target content item. The content feedback engine 102 displays a user interface element for receiving user input accepting or rejecting the recommended content. Additionally or alternatively, the content feedback engine 102 accepts user input moving the recommended content to a different location within the target content item.

One or more embodiments include determining an overall effectiveness score for the target content item with the recommended content (Operation 312). The content feedback engine 102 determines an overall effectiveness score for the target content item as if the recommended content were included in the target content item. Examples for determining an overall effectiveness score for a target content item are described above with reference to Operations 202-214 of FIG. 2.

The content feedback engine 102 may analyze the overall effectiveness score to determine whether to recommend different content for addition to the target content item.

As an example, the content feedback engine 102 may compare the overall effectiveness score to a minimum threshold. If the minimum threshold is not satisfied, then the content feedback engine 102 may reiterate Operations 308-310 to recommend different content for addition to the target content item.

As another example, the content feedback engine 102 may compare (a) the overall effectiveness score of the target content item with the recommended content and (b) an overall effectiveness score of the target content item without the recommended content. If there is no improvement in the overall effectiveness score based on the recommended content, then the content feedback engine 102 may reiterate Operations 308-310 to recommend different content for addition to the target content item. Hence, the content feedback engine 102 recommends content for inclusion into the target content item in order to increase the overall effectiveness score for the target content item.

One or more embodiments include determining whether the contents of the target content item have been modified (Operation 314). A user may modify the target content item by accepting or rejecting the recommended content. Additionally or alternatively, the user may make other modifications to the target content item. The user may continue to modify the target content item as the content feedback engine 102 performs Operations 302-312. If the user has modified the target content item, then the content feedback engine 102 reiterates Operations 302-312 with respect to the modified target content item. Hence, a content feedback engine 102 may recommend content for a target content item as the target content item is being drafted.

One or more embodiments include determining whether the target content item has been published (Operation 316). The content feedback engine 102 receives user input indicating publication of the target content item. The target content item may be published to one or more public forums.

One or more embodiments include comparing (a) an actual effectiveness score for the target content item that was published and (b) the predicted effectiveness score for the target content item with the recommended content (Operation 318).

The content feedback engine 102 determines an actual effectiveness score for the target content item that was published. Examples for determining an effectiveness score of a published content item are described above with reference to Operation 206.

The content feedback engine 102 compares the effectiveness score for the target content item that was published and the overall effectiveness score predicted at Operation 312. As an example, the content feedback engine may determine whether the actual effectiveness score is higher than the predicted effectiveness score. As another example, the content feedback engine may determine whether a difference between the actual effectiveness score and the predicted effectiveness score is above a specified threshold.

The content feedback engine 102 performs one or more actions based on the comparison between the actual effectiveness score and the predicted effectiveness score. As an example, a dashboard may display a list of content items drafted by a particular user. A content feedback engine may cause the effectiveness score and/or the predicted effectiveness score to be displayed on the dashboard. As another example, a content feedback engine may transmit a message to the user who drafted the target content item. The message may inform the user of the effectiveness score and/or the predicted effectiveness score.

5. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 4:
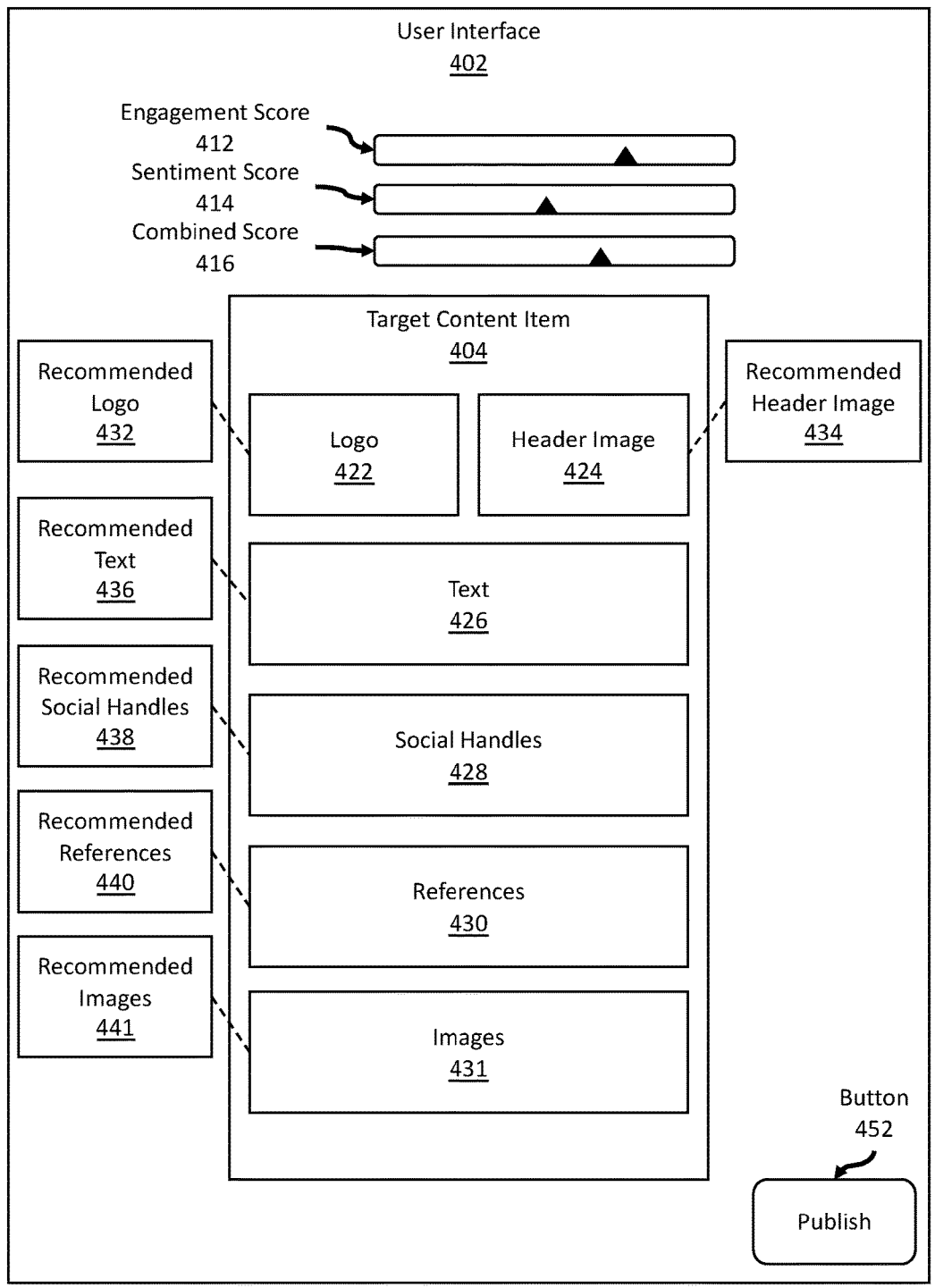
FIG. 4 illustrates an example user interface for presenting a predicted effectiveness score and recommended content for a target content item, in accordance with one or more embodiments.

FIG. 4 illustrates an example user interface for presenting a predicted effectiveness score and recommended content for a target content item, in accordance with one or more embodiments.

As illustrated, FIG. 4 includes a user interface 402 for generating and/or modifying a target content item 404. The target content item 404 is displayed in the bottom-center of the user interface 402. The target content item 404 may include the following content: a logo 422, a header image 424, text 426, social handles 428, references 430, and images 431.

The target content item may be an advertisement to be published by Company Matrix. A user types enters the following text into the target content item 404, "Today, Company Matrix announced the launch of its newest software product: Software Illusion."

A content feedback engine determines attributes of an initial version of the target content item 404, which states, "Today, Company Matrix announced the launch of its newest software product: Software Illusion." The attributes associated with the target content item 404 include, "Software" and "Company Matrix." Further, the content feedback engine determines that "Cloud Computing" is associated with "Company Matrix." The content feedback engine additionally identifies "Cloud Computing" as an attribute associated with the target content item 404.

The content feedback engine identifies published content items with similar attributes as the target content item 404. The content feedback engine determines effectiveness scores of the published content items.

As the content feedback engine identifies the published content items and determines the respective effectiveness scores, the user modifies the target content item 404 via the user interface 402. The user types in the following text, "Software Illusion includes the following features: high speed, high resiliency, and high scalability." Therefore, a second version of the target content item 404 states, "Today, Company Matrix announced the launch of its newest software product: Software Illusion. Software Illusion includes the following features: high speed, high resiliency, and high scalability."

Meanwhile, the content feedback engine identifies the following published content items associated with similar attributes as the initial version of the target content item:

(a) A news article states, "The stock prices of Company A are rising in anticipation of its flagship cloud software, Software XYZ." An engagement score of the news article is 60. A sentiment score of the news article is 65.

(b) An advertisement by Company Nebnet states, "What we need for cloud computing is reliability." An engagement score of the Nebnet advertisement is 80. A sentiment score of the Nebnet adverstisement is 75.

(c) a blog post by a commentator John Smith states, "There are too many software products nowadays." An engagement score of the blog post is 30. A sentiment score of the blog post is 20.

The content feedback engine predicts an engagement score, a sentiment score, and a combined score for the initial version of the target content item 404. The predicted engagement score 412 is an average of the engagement scores of the news article, the Nebnet advertisement, and the blog post, which is 50. The predicted sentiment score 414 is an average of the sentiment scores of the news article, the Nebnet advertisement, and the blog post, which is 45. The predicted combined score 416 is an average of the predicted engagement score 412 and the predicted sentiment score 414, which is 47.5. The content feedback engine displays the predicted engagement score 412, the predicted sentiment score 414, and the predicted combined score 416 on the user interface 402. The predicted engagement score 412, the predicted sentiment score 414, and the predicted combined score 416 are displayed as sliding bars above the target content item 404.

The content feedback engine selects content from the published content items for recommending to the initial version of the target content item 404. The content feedback engine determines that the effectiveness scores of the news article and the Nebnet advertisement are above a specified threshold of 50. The content feedback engine identifies common content and/or attributes associated with the news article and the Nebnet advertisement. A common attribute may be, "Cloud Computing." The content feedback engine determines that the following content is associated with the attribute "Cloud Computing": the text "cloud computing," an image of servers, the social handle "@GadgetGuy," and the reference "An Article on Cloud Networking."

The content feedback engine displays the text "cloud computing" as recommended text 436. The content feedback engine displays the image of servers as a recommended image 441. The content feedback engine displays the social handle "@GadgetGuy" as a recommended social handle 438. The content feedback engine displays the reference "An Article on Cloud Networking" as a recommended reference 440. The recommended text 436, recommended social handle 438, recommended reference 440, and recommended image 441 are displayed on a side section of the user interface 402, adjacent to the target content item 404.

The content feedback engine receives user input accepting all recommendations. The content feedback engine determines that the content of the target content item 404 has been modified. A third version of the target content item 404 now states, "Today, Company Matrix announced the launch of its newest cloud computing software product: Software Illusion. Software Illusion includes the following features: high speed, high resiliency, and high scalability." The third version of the target content item 404 also includes the image of servers, the social handle "@GadgetGuy," and a reference to "An Article on Cloud Networking."

The content feedback engine determines attributes of the third version of the target content item 404. The content feedback engine identifies published content items with similar attributes as the target content item 404. The content feedback engine determines effectiveness scores of the published content items.

The content feedback engine predicts a new engagement score, sentiment score, and combined score for the third version of the target content item 404 based on the effectiveness scores of the published content items. The new predicted engagement score 412 is 65. The new predicted sentiment score 414 is 55. The new predicted combined score 416 is 60. The content feedback engine adjusts the sliding bars above the target content item 404 to reflect the new predicted scores.

The content feedback engine selects content from the published content items for recommending to the third version of the target content item 404. The content feedback engine selects a particular logo and a particular header image for recommending to the target content item 404. The content feedback engine displays the particular logo as recommended logo 432. The content feedback engine displays the particular header image as recommended image 434.

The content feedback engine receives user input rejecting the recommendations. Subsequently, the user selects the "Publish" button 452. The third version of the target content item 404 is published to a social media platform.

Figure 5:
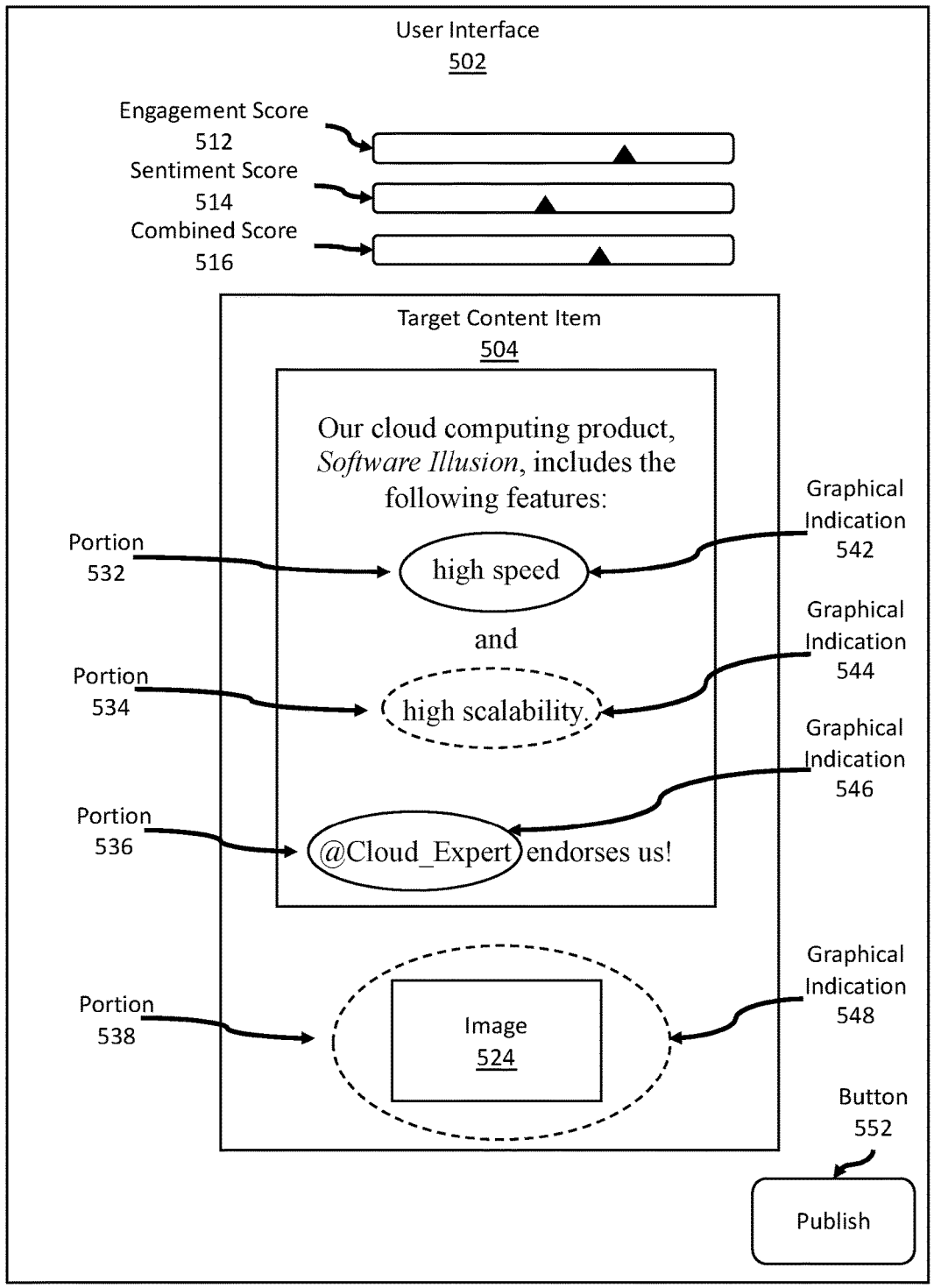
FIG. 5 illustrates an example user interface for presenting graphical indications that mark portions of a target content item based on effectiveness scores for the portions of the target content item, in accordance with one or more embodiments.

FIG. 5 illustrates an example user interface for presenting graphical indications that mark portions of a target content item based on effectiveness scores for the portions of the target content item, in accordance with one or more embodiments.

As illustrated, FIG. 5 includes a user interface 502 for generating and/or modifying a target content item 504. The target content item 504 is displayed in the bottom-center of the user interface 502. The target content item 504 includes the text "Our cloud computing product, Software Illusion, includes the following features: high speed and high scalability. @Cloud_Expert endorses us!" Within the text, @Cloud_Expert is a social handle referring to a particular user of a social media platform. The target content item 504 also includes an image 524 of a cloud server. The target content item 504 is an advertisement for a cloud computing software product.

A content feedback engine identifies portions 532-538 for analysis. Portion 532 includes "high speed." Portion 534 includes "high scalability." Portion 536 includes "@Cloud_Expert." Portion 538 includes the image 524.

The content feedback engine identifies a set of published content items sharing similar attributes as the target content item 504. The set of published content items are all advertisements for cloud computing software products. The set of published content items include a total of 100 published content items. A first subset of the 100 published content items includes the phrase "high speed." A second subset of the 100 published content items includes the phrase "high scalability." A third subset of the 100 published content items includes the social handle "@Cloud_Expert." A fourth subset of the 100 published content items includes an image of a cloud server similar to the image 524.

The content feedback engine determines effectiveness scores of the first subset of published content items (which include the phrase "high speed"). The content feedback engine determines that an average of the effectiveness scores of the first subset of published content items is 40. The content feedback engine determines that an effectiveness score of 40 corresponds to the portion 532 of the target content item 504.

The content feedback engine determines effectiveness scores of the second subset of published content items (which include the phrase "high scalability"). The content feedback engine determines that an average of the effectiveness scores of the second subset of published content items is 80. The content feedback engine determines that an effectiveness score of 80 corresponds to the portion 534 of the target content item 504.

The content feedback engine determines effectiveness scores of the third subset of published content items (which include the social handle "@Cloud_Expert"). The content feedback engine determines that an average of the effectiveness scores of the third subset of published content items is 30. The content feedback engine determines that an effectiveness score of 30 corresponds to the portion 536 of the target content item 504.

The content feedback engine determines effectiveness scores of the fourth subset of published content items (which include an image of a cloud server similar to the image 524). The content feedback engine determines that an average of the effectiveness scores of the fourth subset of published content items is 70. The content feedback engine determines that an effectiveness score of 70 corresponds to the portion 538 of the target content item 504.

The content feedback engine determines that there are two candidate graphical indications that may be presented. A solid-line circle may be presented based on an effectiveness score for a portion of a target content item that is between 0 and 50. A dotted-line circle may be presented based on an effectiveness score for a portion of a target content item that is between 50 and 100.

Based on the effectiveness scores of each portion 532-538, the content feedback engine presents a graphical indication 542-548 that marks each portion 532-538. Specifically, since the effectiveness score of portion 532 is determined as 40, the content feedback engine presents a solid-line circle around portion 532. Since the effectiveness score of portion 534 is determined as 80, the content feedback engine presents a dotted-line circle around portion 534. since the effectiveness score of portion 536 is determined as 30, the content feedback engine presents a solid-line circle around portion 536. Since the effectiveness score of portion 538 is determined as 70, the content feedback engine presents a dotted-line circle around portion 538.

The content feedback engine determines an overall engagement score 512 for the target content item 504 based on the engagement scores of the set of published content items sharing similar attributes as the target content item 504.

The content feedback engine determines an overall sentiment score 514 for the target content item 504 based on the sentiment scores of the set of published content items sharing similar attributes as the target content item 504.

The content feedback engine determines an overall combined score 516 for the target content item 504 based on the overall engagement score 512 and the overall sentiment score 514. Additionally or alternatively, the content feedback engine determines an overall combined score 516 for the target content item 504 based on engagement scores and/or sentiment scores associated with the first subset of published content items, the second subset of published content items, the third subset of published content items, and the fourth subset of published content items.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
   determining a first effectiveness score corresponding to a first subset of published content items that share one or more attributes with at least a first portion of a target content item that is being drafted;
   wherein the first effectiveness score is indicative of at least one of a predicted level of engagement and a predicted level of sentiment associated with a hypothetical content item having the first portion that is published on at least one social networking platform;
   determining a second effectiveness score corresponding to a second subset of published content items that share one or more attributes with at least a second portion of the target content item that is being drafted; and presenting, on a graphical user interface for drafting the target content item, (a) a first graphical indication that marks the first portion of the target content item based on the first effectiveness score, without marking one or more other portions of the target content item based on the first effectiveness score and (b) a second graphical indication that marks the second portion of the target content item based on the second effectiveness score.

2. The medium of claim 1, wherein the operations further comprise:
identifying a third subset of published content items that share one or more attributes with at least the first portion of the target content item that is being drafted;
selecting a portion of the third subset of published content items; and
generating a recommendation to add the selected portion of the third subset of published content items into the target content item.

3. The medium of claim 2, wherein the selected portion of the third subset of published content items comprises a social handle.

4. The medium of claim 2, wherein the selected portion of the third subset of published content items comprises a topic.

5. The medium of claim 1, wherein the operations further comprise:
identifying a third subset of published content items that share one or more attributes with at least the first portion of the target content item that is being drafted;
selecting a portion of the third subset of published content items; and
generating a recommendation to replace current content in the target content item with the selected portion of the third subset of published content items.

6. The medium of claim 1, wherein the operations further comprise:
determining an overall effectiveness score of the target content item based on the first effectiveness score and the second effectiveness score; and
presenting, on the graphical user interface for drafting the target content item, a third graphical indication based on the overall effectiveness score.

7. The medium of claim 1, wherein the first effectiveness score is based on an engagement score corresponding to each of the first subset of published content items, and the second effectiveness score is based on a sentiment score corresponding to each of the second subset of published content items.

8. The medium of claim 7, wherein the operations further comprise:
determining the engagement score corresponding to a particular published content item, of the first subset of published content items, based on at least one of: (a) a number of users that viewed the particular published content item, and (b) a number of users that took an action in association with the particular published content item.

9. The medium of claim 7, wherein the operations further comprise:
determining the sentiment score corresponding to a particular published content item, of the second subset of published content items, based on a level of positivity or negativity corresponding to actions taken in association with the particular published content item.

10. The medium of claim 1, wherein the first effectiveness score corresponding to the first subset of published content items is determined based at least on data obtained through monitoring user interaction with a particular published content item, of the first subset of published content items.

11. The medium of claim 1, wherein determining the first effectiveness score corresponding to the first subset of published content items comprises:
monitoring user interaction with a particular published content item, of the first subset of published content items, to obtain information associated with the user interaction;
determining the first effectiveness score corresponding to the first subset of published content items based at least on the information associated with the user interaction.

12. The medium of claim 11, wherein the information associated with the user interaction comprises one or more of:
a number of viewers of the particular published content item;
a number of likes associated with the particular published content item;
a number of comments associated with the particular published content item;
a number of users who shared the particular published content item;
a number of users who took action in association with the particular published content item.

13. A method, comprising:
determining a first effectiveness score corresponding to a first subset of published content items that share one or more attributes with at least a first portion of a target content item that is being drafted;
wherein the first effectiveness score is indicative of at least one of a predicted level of engagement and a predicted level of sentiment associated with a hypothetical content item having the first portion that is published on at least one social networking platform;
determining a second effectiveness score corresponding to a second subset of published content items that share one or more attributes with at least a second portion of the target content item that is being drafted; and
presenting, on a graphical user interface for drafting the target content item, (a) a first graphical indication that marks the first portion of the target content item based on the first effectiveness score, without marking one or more other portions of the target content item based on the first effectiveness score and (b) a second graphical indication that marks the second portion of the target content item based on the second effectiveness score;
wherein the method is performed by at least one device including a hardware processor.

14. The method of claim 13, further comprising:
identifying a third subset of published content items that share one or more attributes with at least the first portion of the target content item that is being drafted;
selecting a portion of the third subset of published content items; and
generating a recommendation to add the selected portion of the third subset of published content items into the target content item.

15. The method of claim 14, wherein the selected portion of the third subset of published content items comprises a social handle.

16. The method of claim 14, wherein the selected portion of the third subset of published content items comprises a topic.

17. The method of claim 13, further comprising:
identifying a third subset of published content items that share one or more attributes with at least the first portion of the target content item that is being drafted;
selecting a portion of the third subset of published content items; and
generating a recommendation to replace current content in the target content item with the selected portion of the third subset of published content items.

18. A system comprising:
at least one device including a hardware processor; and
the system being configured to perform operations comprising:
determining a first effectiveness score corresponding to a first subset of published content items that share one or more attributes with at least a first portion of a target content item that is being drafted;
wherein the first effectiveness score is indicative of at least one of a predicted level of engagement and a predicted level of sentiment associated with a hypothetical content item having the first portion that is published on at least one social networking platform;
determining a second effectiveness score corresponding to a second subset of published content items that share one or more attributes with at least a second portion of the target content item that is being drafted; and
presenting, on a graphical user interface for drafting the target content item, (a) a first graphical indication that marks the first portion of the target content item based on the first effectiveness score, without marking one or more other portions of the target content item based on the first effectiveness score and (b) a second graphical indication that marks the second portion of the target content item based on the second effectiveness score.

19. The system of claim 18, wherein the operations further comprise:
identifying a third subset of published content items that share one or more attributes with at least the first portion of the target content item that is being drafted;
selecting a portion of the third subset of published content items; and
generating a recommendation to add the selected portion of the third subset of published content items into the target content item.

20. The system of claim 18, wherein the operations further comprise:
identifying a third subset of published content items that share one or more attributes with at least the first portion of the target content item that is being drafted;
selecting a portion of the third subset of published content items; and
generating a recommendation to replace current content in the target content item with the selected portion of the third subset of published content items.

* * * * *